Sept. 1, 1953 S. P. BRICKETT 2,650,671
OIL DISCHARGE PASSAGE ARRANGEMENT FOR HIGH-SPEED BEARINGS
Filed Sept. 25, 1952 2 Sheets-Sheet 1

Inventor:
Sherman P. Brickett,
by Richard E. Hosley
His Attorney.

Sept. 1, 1953 S. P. BRICKETT 2,650,671
OIL DISCHARGE PASSAGE ARRANGEMENT FOR HIGH-SPEED BEARINGS
Filed Sept. 25, 1952 2 Sheets-Sheet 2
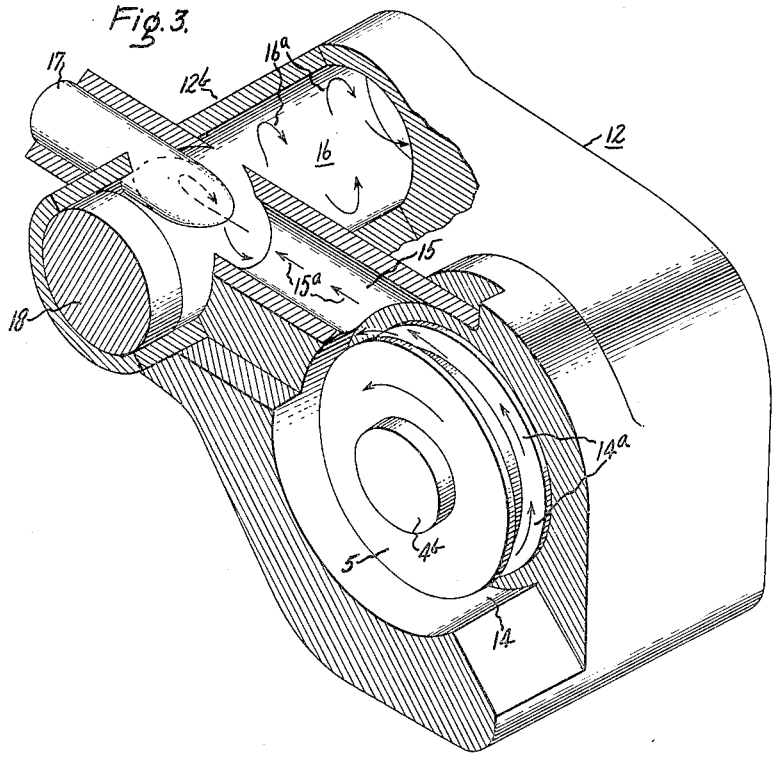
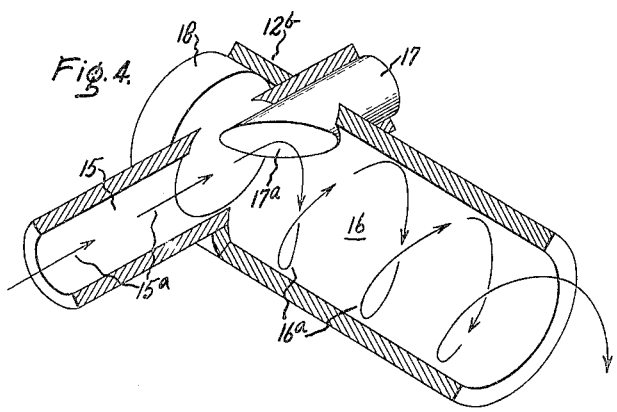
Inventor:
Sherman P. Brickett,
by Richard E. Hosley
His Attorney.

Patented Sept. 1, 1953

2,650,671

UNITED STATES PATENT OFFICE 2,650,671

OIL DISCHARGE PASSAGE ARRANGEMENT FOR HIGH-SPEED BEARINGS

Sherman P. Brickett, Lynn, Mass., assignor to General Electric Company, a corporation of New York Application September 25, 1952, Serial No. 311,341

3 Claims. (Cl. 183—2.5)

This invention relates to lubricating systems for bearings, particularly to the arrangement of the passages for discharging used lubricating oil from a high speed bearing.

In high capacity bearings, for instance the thrust bearing of a prime mover such as a steam turbine having a heavy rotor, or the high speed pinion of a reduction gear set, it is necessary to supply lubricant far in excess of that required for lubricating purposes in order to carry away the substantial amount of heat generated. In order to insure an adequate flow of oil through the bearing, it is necessary not only to provide a suitable supply of lubricant but also to make sure that heated oil is freely discharged from the bearing. This problem is complicated by the fact that rotating parts of the bearing assembly tend to whip the oil into a froth, so that an extremely large discharge conduit is required. Even then, the foamy mass of oil may tend to remain in the bearing instead of being discharged smoothly and continuously so as to clear the bearing for the admission of fresh cool oil.

Accordingly, the object of the present invention is to provide an improved discharge passage arrangement for facilitating the removal from a bearing of hot used lubricant in spite of the presence of entrained gases.

A further object is to provide an improved lubricant drain arrangement which utilizes the kinetic energy of the oil leaving the bearing to propel it rapidly through the discharge passage with minimum turbulence, so as to reduce the formation of foam.

A still further object is to provide an improved bearing drain arrangement of the type described which is mechanically simple and involves comparatively little enlargement of the bearing housing.

Figure 1:
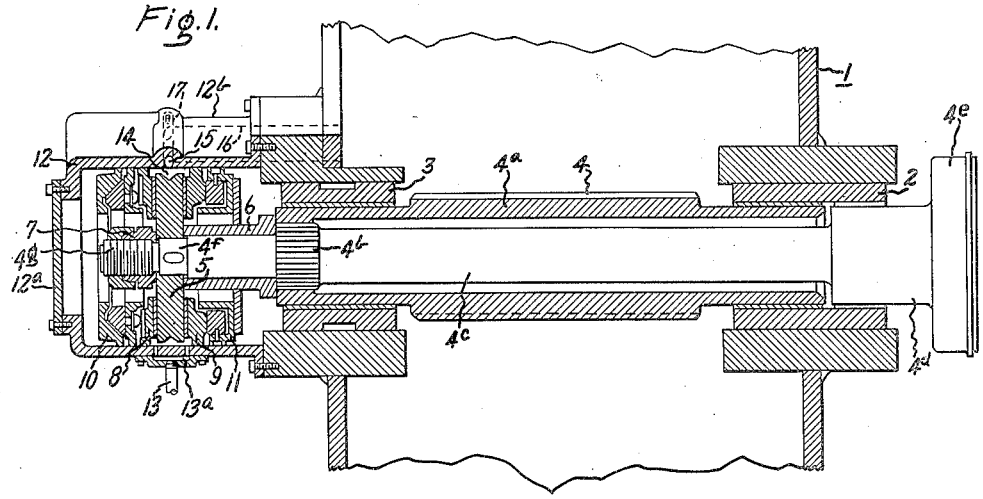
Figure 2:
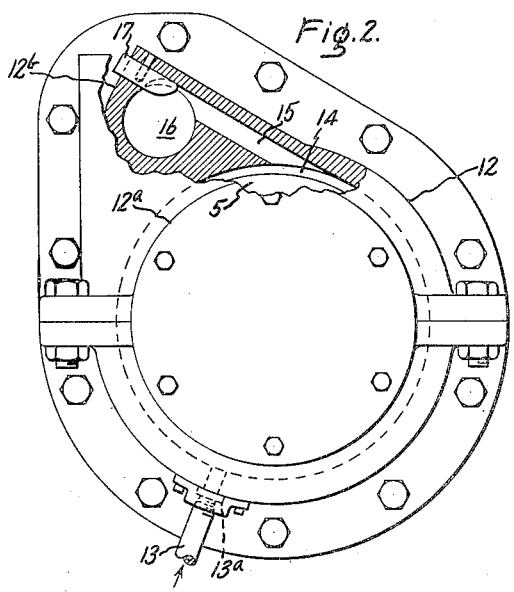

Other objects and advantages will become apparent from the following description taken in connection with the accompanying drawings, in which Fig. 1 is a partial view in section of a large reduction gear having a high speed pinion shaft with a thrust bearing arranged in accordance with the invention, Fig. 2 is an end view, partly in section, of the thrust bearing housing, Fig. 3 is a perspective view of a thrust bearing with portions of the housing broken away to show the oil discharge arrangement, and Fig. 4 is a diagrammatic perspective view illustrating the method of operation.

Generally stated, the invention is practiced by providing the bearing with a primary tangentially disposed oil discharge passage arranged to receive a high velocity stream of oil from a rotating member of the bearing, the primary passage discharging tangentially into an enlarged cylindrical chamber disposed at right angles to the primary passage, with special baffle means at the intersection to direct the high velocity jet of oil from the primary passage into a smooth vortex flow in the secondary passage. The vortex in the secondary chamber serves to separate the entrained foam from the liquid and discharge the liquid without impedance from the foam, which latter occupies the "air core" of the vortex.

Referring now more particularly to Fig. 1, the invention is illustrated as applied to a reduction gear unit having a casing indicated generally at 1 provided with journal bearings 2, 3 for the high speed pinion 4. This pinion is of a "quill" construction having a hollow cylindrical outer member 4a on which are machined the gear teeth, and being connected by a spline 4b to an internal shaft 4c. Shaft 4c has an enlarged journal portion 4d which is also supported in the journal bearing 2, and a power input coupling flange 4e.

The thrust bearing assembly comprises a rotating thrust disk member illustrated as being formed separately and keyed to a reduced diameter extension 4f of the power input shaft. As shown in Fig. 1, thrust disk 5 is disposed between a spaced sleeve 6 and a retaining nut member 7 carried on a threaded extension 4g of the shaft. The respective side faces of thrust disk 5 are engaged by a plurality of pivotally supported segments or "shoes" 8, 9. Those familiar with the bearing art will appreciate that this may be of the well known "Kingsbury" type of bearing, but the invention is not limited to use with such a bearing. It is obviously applicable to other bearings having a thrust flange or disk member corresponding to disk 5.

The pivoted segments 8, 9 are supported on ring members 10, 11, respectively, which are suitably secured in the housing 12, which may have a removable end plate 12a. Further constructional details of the bearing itself are not necessary for an understanding of the present invention and therefore need not be further described here.

Oil for lubricating and cooling the bearing is supplied at a suitable pressure from a pump (not shown), as for instance through an inlet conduit 13. This lubricant is distributed to the respective thrust surfaces of the disk member 5 by supply passages indicated diagrammatically at 13a the details of which are not material here. It need only be observed that oil at a suitable pressure and temperature is supplied through conduit 13 in quantities sufficient to carry away the heat generated in the bearing, provided that free egress of hot used lubricant from the bearing is assured.

In accordance with the present invention, the lubricant discharge arrangement comprises primary and secondary discharge passage portions disposed at right angles to one another and located in a comparatively small extension of the bearing housing, indicated at 12b in Fig. 1. The plan shape of this housing portion may be seen from the end view of Fig. 2. It will be observed that the circumference of the thrust disk 5 is spaced from the surrounding housing portion to define an annular chamber 14, in which space spent lubricating oil circulates at high velocity as a forced vortex by reason of the frictional pumping action of the disk. The present invention makes effective use of the kinetic energy in this high velocity vortex to insure free discharge of oil from the bearing chamber.

The special discharge passage arrangement comprises three elements: a primary discharge passage portion shown at 15 in Fig. 1; a cylindrical secondary chamber 16; and a special baffle member 17 at the intersection of the primary and secondary portions.

It will be seen in Fig. 1 that the primary discharge passage 15 is disposed in the plane of the thrust disk 5 with its inlet in communication with the annular vortex chamber 14. The secondary chamber 16 is disposed at right angles to the passage 15, intersecting the latter at a comparatively short distance, measured radially, from the vortex chamber 14.

The relation between the primary and secondary passage portions 15, 16 will be seen better in Fig. 2. The primary passage 15 is of comparatively smaller diameter and is disposed tangential relative to the chamber 14. The outer end portion of passage 15 discharges tangentially into the substantially larger diameter secondary passage 16.

The special baffle member 17 may be conveniently formed as a cylindrical plug rotatably disposed in the exterior end portion of passage 15. Thus member 17 performs the dual function of plugging the outer end of passage 15 and serving as a flow directing baffle, as follows.

The disposition of discharge passage portions 15, 16 and the baffle 17 relative to the thrust bearing, and the method of operation, may be seen even better from the perspective views of Figs. 3 and 4. Here it will be observed that the secondary chamber 16 may conveniently be formed by boring an axial hole entirely through the thrust bearing housing portion 12b and plugging the outer end with a disk member 18.

The operation is as follows. The high velocity vortex flow of spent lubricant in the annular chamber 14 is represented by the flow arrows 14a. Centrifugal force causes this oil to be discharged at high velocity through the tangential primary passage 15, as indicated by flow arrows 15a. This high velocity jet 15a impinges on the end surface of the baffle member 17. It will be seen best in Fig. 4 that the end surface 17a of plug member 17 is inclined at an acute angle to the axis of the plug. While the angle which surface 17a makes with the axis of plug member 17 may vary somewhat, in the present instance it has been found that an angle of 45° with the axis of the plug is suitable.

The function of this inclined baffle surface is to receive the high velocity jet 15a and change its direction smoothly so as to preserve the kinetic energy thereof and minimize turbulence, so that a vortex having a high tangential velocity and a substantial axial velocity is formed in the secondary chamber 16, as indicated by the flow arrows 16a. To this end, it is necessary that plug 17 be rotatably adjusted until the best flow characteristics are obtained. The precise angle required for best operation is, of course, readily determined from a simple test of the first machine built. With the machine operating, plug 17 is simply rotated 360° to determine the position at which oil is discharged from the inner end of passage 16 with the least amount of foam and the greatest rate of flow. The plug is then secured, as by tack-welding. Once this angle is determined for a given machine having a specified rate of lubricant supply to the bearings and rotational speed of the thrust disk 5, the baffle plug 17 may be assembled in the same angular relation in subsequent like machines, without the necessity of a test.

It will be readily apparent from Fig. 4 that the angular disposition of the baffle surface 17a relative to the high velocity jet 15 must be such that the vortex flow 16a has not only a high velocity tangential component but a substantial axial component to the right, that is towards the inner discharge end of passage 16. As will be seen from Fig. 1, this whirling body of oil is discharged into the interior of the gear casing 1, whence it is returned to the lubricating pump, after suitable cooling, by a suitable scavenger pump (not shown) or equivalent gravity drain arrangement.

This oil discharge passage arrangement has numerous important advantages. In the first place, it occupies a minimum amount of space. It will be observed from Figs. 1 and 2 that it requires only a comparatively minor enlargement at one side of the bearing housing. The discharge passage is formed entirely by passages easily machined in the bearing housing itself, no external oil piping being required. The arrangement makes use of the kinetic energy generated in the vortex chamber 14 to insure the very rapid discharge of hot oil through conduit 15. Thus, instead of being dissipated in foam-producing turbulence, the kinetic energy of the jet is preserved and utilized to form the high velocity vortex 16a in the secondary chamber. Chamber 16 acts as a "centrifuge chamber" serving to separate entrained bubbles from the oil, so that the vortex 16a is substantially foam-free, while the foam separated from the liquid occupies the "air core" of the vortex. There will be an air core of substantial size, due to the fact that the secondary chamber 16 is several times larger in diameter than the primary passage 15. To this end, it is desirable that the secondary chamber be at least two and perhaps as many as four times the diameter of primary passage 15. This insures adequate space within vortex 16a for the foam to flow axially through the secondary chamber.

The arrangement is found to provide very smooth and rapid discharge of comparatively foam-free liquid with a minimum of turbulence, so that the flow of cooling oil through the bearing at the desired rate is not impeded. At the same time, the structure is comparatively simple to manufacture and makes very little increase in the size of the bearing housing.

It will be obvious to those skilled in the art that the application of the invention is not limited to bearings of the precise construction disclosed herein, being applicable to any high speed bearing requiring a substantial flow of oil for cooling purposes and having a high speed rotating member which generates a strong vortex adjacent the rotating member. The structure of the members defining the primary discharge passage, the secondary vortex chamber and the baffle member may obviously take many forms; and it is of course intended to cover by the appended claims all such modifications as fall within the true spirit and scope of the invention.

What I claim as new and desire to secure by Letters Patent of the United States is:

1. In a housing for a high speed rotor member, the housing defining with the rotor an annular vortex chamber and having means for supplying a liquid thereto, whereby the liquid is impelled at high tangential velocity in the vortex chamber, the combination of walls defining passages for removing liquid from the vortex chamber including a primary passage disposed tangentially with an inner end portion communicating with the vortex chamber and an outer end portion discharging tangentially into one end of a cylindrical secondary chamber disposed with its axis substantially at right angles to the axis of the primary chamber, said secondary chamber being at least twice the diameter of the primary passage, and baffle means disposed at the intersection of the primary and secondary chambers for directing the high velocity jet from the primary passage to form a vortex in the secondary chamber having high tangential velocity and a substantial axial component towards the other end thereof.

2. In a housing for a high speed rotor member having a disk with an annular vortex chamber extending around the circumference thereof and means for supplying a liquid to said vortex chamber whereby the liquid is impelled at high tangential velocity therein by rotation of the disk, the combination of walls defining passages for discharging liquid from the vortex chamber, said walls defining a primary passage disposed tangentially relative to the vortex chamber and having an inner end portion communicating therewith, the outer end portion of the primary passage discharging tangentially into one end of a cylindrical secondary chamber disposed with its axis substantially at right angles to the axis of the primary chamber, the secondary chamber being substantially larger in diameter than the primary passage, and baffle means disposed at the intersection of said primary and secondary chambers for directing the high velocity jet from the primary passage to form a vortex in the secondary chamber with a substantial axial component towards the other end thereof, whereby the high velocity vortex in the secondary chamber tends to separate foam from liquid, the foam being discharged axially through the air core of the liquid vortex.

3. A high speed rotor housing in accordance with claim 2 in which the baffle member comprises a cylindrical plug member disposed coaxial with the primary passage and having an inclined end surface for receiving the high velocity jet from the primary passage and directing it into the secondary chamber with high tangential component and a substantial axial component, whereby the baffle plug member may be rotatably adjusted about its axis to secure the optimum flow characteristics in the secondary chamber.

SHERMAN P. BRICKETT.

No references cited.